United States Patent [19]

Schlueter et al.

[11] Patent Number: 5,039,251
[45] Date of Patent: Aug. 13, 1991

[54] APPARATUS AND METHODS FOR AGRICULTURAL IRRIGATION

[76] Inventors: James C. Schlueter; Lorri J. Schlueter, both of 230 Lake St., Fort Morgan, Colo. 80701

[21] Appl. No.: 515,580
[22] Filed: Apr. 26, 1990
[51] Int. Cl.⁵ .................. A01G 25/16; A01G 25/02
[52] U.S. Cl. .................................. 405/39; 405/43; 405/51; 137/875; 137/876
[58] Field of Search .............. 137/875, 876, 624.2; 405/36, 39, 40, 43, 44, 45, 51

[56] References Cited

U.S. PATENT DOCUMENTS

| | | | |
|---|---|---|---|
| 1,484,575 | 2/1924 | Shulin . | |
| 3,539,106 | 11/1970 | Ramik | 239/145 |
| 3,698,195 | 10/1972 | Chapin . | |
| 3,860,179 | 1/1975 | Costa | 239/542 |
| 3,912,165 | 10/1975 | Pira | 239/11 |
| 4,123,006 | 10/1978 | Yukishita | 239/266 |
| 4,162,041 | 7/1979 | Hane | 239/266 |
| 4,267,972 | 5/1981 | Bryant | 239/66 |
| 4,332,105 | 6/1982 | Nir | 47/1 R |
| 4,824,019 | 4/1989 | Lew | 239/201 |
| 4,917,535 | 4/1990 | Prassas | 405/36 |

Primary Examiner—Dennis L. Taylor
Assistant Examiner—John Ricci
Attorney, Agent, or Firm—Dorr, Carson, Sloan & Peterson

[57] ABSTRACT

An agricultural irrigation system comprised of a plurality of unit pipes which constitute a water supply pipe line and another plurality of unit pipes which constitute a water dispensing line each of whose respective pipe units are connected in series by one or more separate center, valve/connectors which couple successive pipe units of both the water supply pipe line and the water dispensing pipe line.

8 Claims, 9 Drawing Sheets

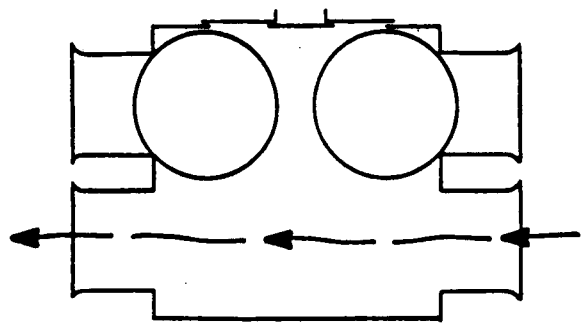
Fig. 1E
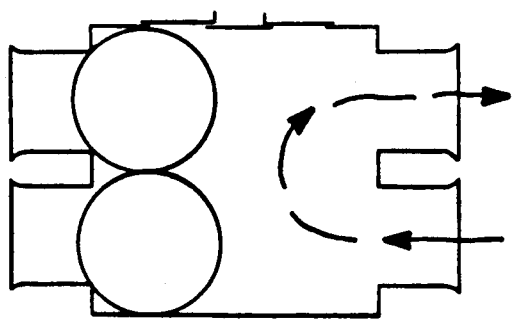
Fig. 1F
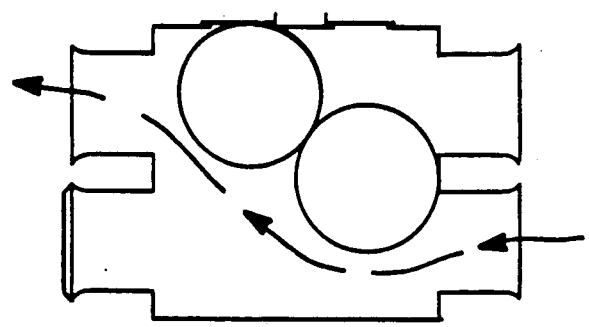
Fig. 1G
Fig. 1H
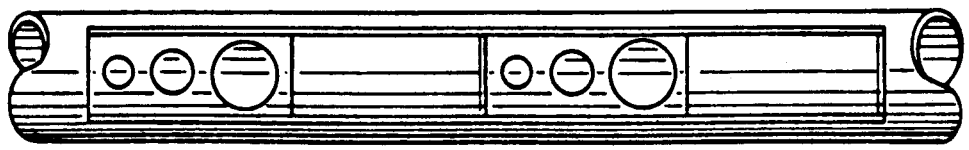

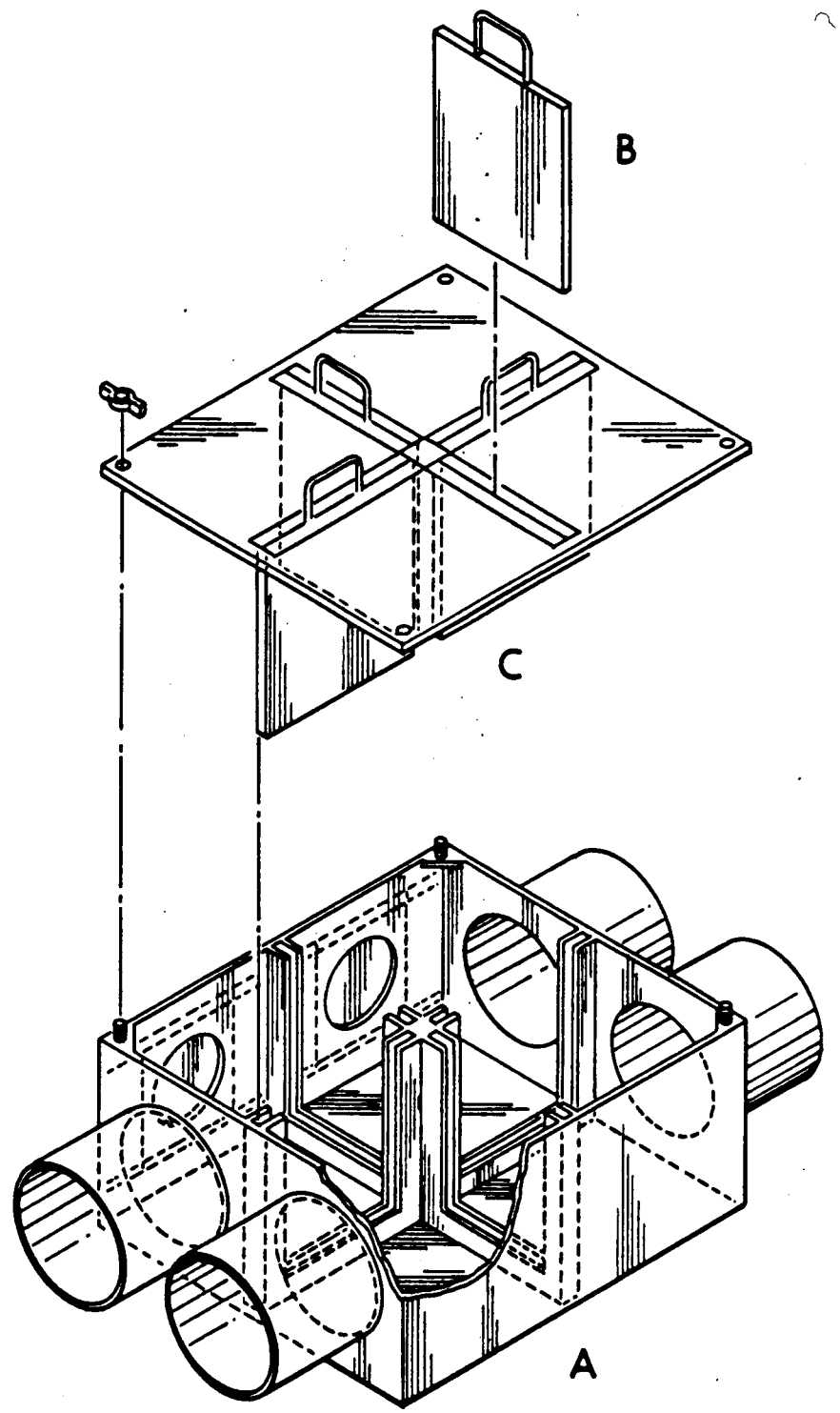
Fig. 1-J

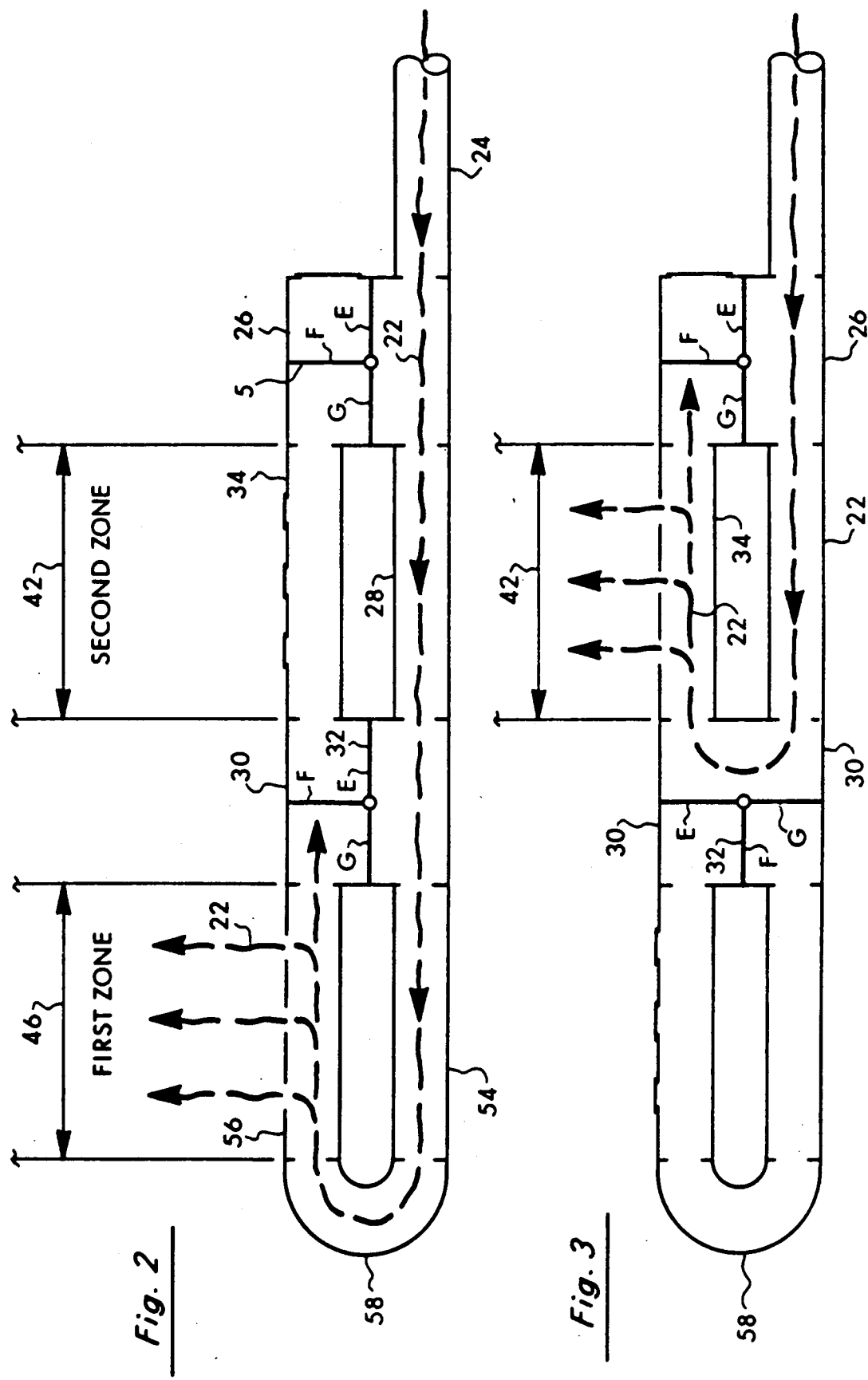

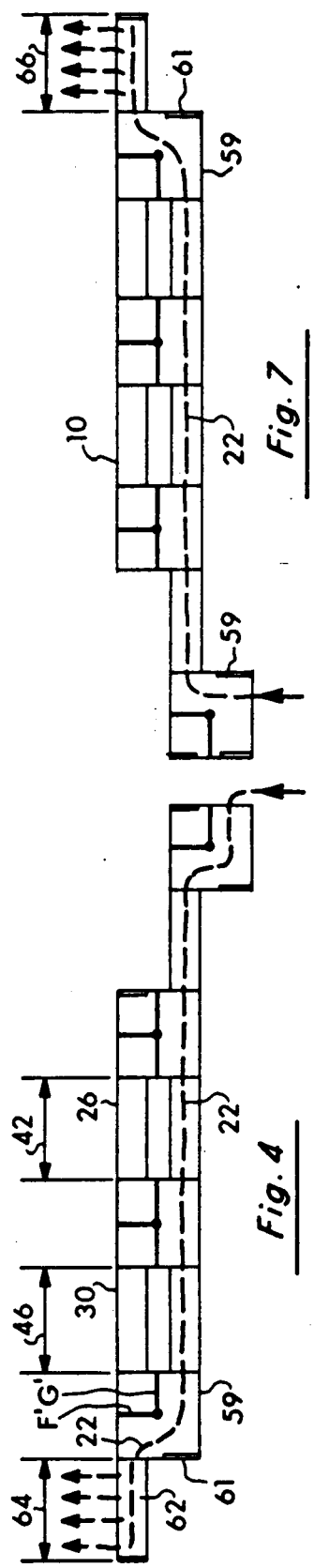
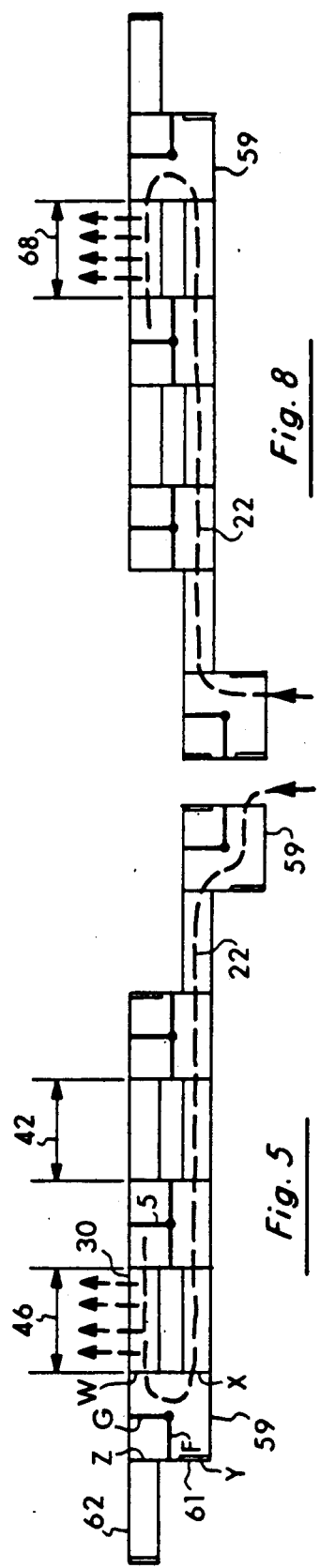
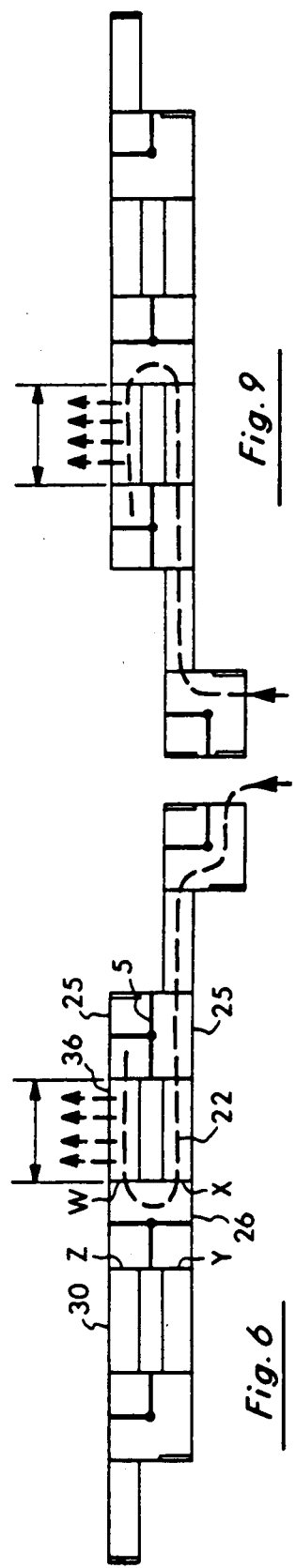

APPARATUS AND METHODS FOR AGRICULTURAL IRRIGATION

FIELD OF THE INVENTION

The apparatus and methods of this patent disclosure are generally concerned with agricultural irrigation systems. More specifically this invention is concerned with agricultural irrigation systems designed to deliver uniform water flow rates over the length of such irrigation systems.

BACKGROUND OF THE INVENTION

Single-pipe agricultural irrigation systems comprised of an interconnected series of water sprinkling pipes are used extensively in agriculture, horticulture and golf course maintenance. Typical single-pipe systems emit water from many holes along the entire length of a given pipe series. This is usually accomplished with the aid of hydrostatic pressure delivered by pumps. Hence water and/or other liquids (such as fertilizers) are sprayed or otherwise released into crop growing areas contiguous to the pipe series. However, differences in hydrostatic pressure develop as the series of watering pipes is extended. That is to say, fluid pressure decreases from the pipe nearest the water supply pump to the pipe most remote from that pump. This pressure decrease causes different amounts of water to be released over the length of the pipe series. For example, longer sprinkling distances are created in areas nearer to the water pressure source and shorter sprinkling distances are experienced in areas more remote from that source of water pressure. Concomitantly, those water dispensing holes which are under greater fluid pressure deliver greater volumes of fluid than those at the end of the pipe series.

In most cases it is generally regarded as being undesirable to have different sprinkling rates, volumes and/or spray distances for any given field under cultivation. However, in some cases, field conditions may dictate changes in water requirements. One simple example of this would be the case where one desires to supply more water to an area receiving more abundant sunshine while limiting water delivery to a contiguous shaded area under cultivation with the same crop. Other kinds of problems can arise from water delivery variations. Not the least of these is the fact that some areas may be over fertilized as well as overwatered while other areas are under fertilized and/or underwatered owing to the fact that fertilizing liquids are often mixed in with the irrigation water being dispensed.

For the most part, water uniformity in such single-pipe systems is pursued by adjusting the flow rates and/or pressures of the water being released, use of alternative watering systems and/or movement of individual pipe elements to create other pipe system configurations. Some prior art attempts to better regulate irrigation water flow have employed two or even three main water supply pipes which are interjected at different places in the system in order to try to minimize water pressure differences along the length of a given pipe series. However, use of such multiple main water supply pipes systems implies higher capital cost as well as those higher labor costs implicit in any field modifications of such multi-pipe systems.

Other sprinkling devices employing a single pipe which is divided into two separate chambers have been employed in order to minimize some of the above-noted pressure differential problems. Most of these two-chambered, single pipe systems are comprised of a series of elongated pipes each of which are divided into two distinct chambers by a separator wall running in the pipe's lengthwise direction. Typically, one chamber has a large cross section and the other has a smaller cross section. Hence the large section best serves as a water supply pipe and the smaller as a water dispensing pipe. The supply pipe chamber and the dispensing pipe chamber are placed in fluid communication with each other by a certain number of holes in the interior wall between the chambers for every unit length of pipe. Consequently, any water or other liquid introduced into the water supply pipe flows into the water dispensing pipe through such communication holes and is thereafter sprinkled from other holes in the outside walls of the water dispensing pipe. The size of the fluid communication holes in the interior walls is adjusted from the outside of the pipe by means of adjustment bolts which adjust the flow rate of liquid introduced from the supply chamber to the dispensing chamber. Typically, this is done for every unit length of the double pipe. Hence, the sprinkling distances and/or volumes can be adjusted for each pipe unit.

For each unit length of such two chambered pipe, the supply pipe is open at both of its ends and the dispensing pipe is closed at both of its ends. Hence, where a plurality of such pipes are connected in series to construct a water sprinkling system, the supply pipes are in fluid communication throughout their entire length, while the dispensing pipes for each unit of pipe can be regulated. Again, sprinkling distances, volumes, etc. for each unit length must be regulated by means of adjustment screws for the pipe unit. In practice, adjustments and/or settings of such adjustment screws differ as the distance of a given pipe unit from the source of water pressure is increased.

Unfortunately, these two chamber pipes are very difficult, and hence very expensive, to manufacture. This is especially true in the case of those steel pipes which are typically used in large scale agricultural irrigation systems. Consequently, most two chambered pipes are manufactured by extrusion of synthetic resin materials. However, problems of quality control do occur even when working with extruded synthetic resins. Problems are particularly apt to occur in the cooling of recently extruded resins wherein shrinkage occurs in the separator wall. This shrinkage gives rise to the formation of cracks and separations and, hence, introduces possibilities for leakage from the water supply chamber to the water dispensing chamber. At best then, such synthetic resin, two chambered pipes are only suited to small scale, low pressure, water dispensing systems such as those employed in greenhouses.

Furthermore, since the dispensing pipe chamber is closed at both of its ends for every unit length, it is difficult to inspect and/or clean its inside once the pipe is manufactured. This is a serious drawback because dust and dirt or impurities contained in the liquid being dispensed tend to accumulate in the dispensing pipe. This causes the spurting holes of the dispensing pipes to become clogged, and thereby reduces the effectiveness of the entire sprinkling system.

Some small, low pressure, horticultural scale, two-pipe watering sprinkling systems comprised of two essentially separate pipes also have been developed. A representative system of this type is taught in U.S. Pat.

No. 4,162,041. This particular system is generally comprised of a connection socket of a first type including a tubular main pipe connection part and a tubular sub-pipe connection part. The connection parts are united to the pipe at a part of the periphery of each connection part. They are also provided with an internal closure near to their centers. A connection socket of a second type, including a tubular main pipe connection part and a tubular sub-pipe connection part, along with such connection parts, are united to each other at the periphery of each connection pipe. They are placed in fluid communication with each other through an opening at the pipe's central portion. This connection of the second type usually includes a valve for adjusting the amount of liquid passing through the opening from the main pipe to the sub-pipe. Consequently, many ♭fine adjustments" are required because each valve adjustment is contemplated to operate over a continuous range rather than to operate only in an "on" or "off" mode of operation. Moreover, because all sub-pipes are simultaneously fed from the same main pipe, pressure differentials do develop over the length of such a pipe series if more than one sub-pipe is employed at the same time.

In another version of the liquid sprinkling device of U.S. Pat. No. 4,162,041, the connection parts are united to each other at a part of the periphery of each connection part and communicate with each other through an opening at its central portion. In effect all main pipes are in continuous fluid communication. Consequently, water flow cannot be directed to any particular member of the main pipe series of pipes. The connection socket also includes a valve device, disposed near the opening, for adjusting the amount of liquid passing from the main pipe, through the opening and then flowing in the sub-pipe connection part.

This approach gives satisfactory effects in the context of watering those relatively smaller areas used in horticultural, e.g., greenhouse, activities in that the pressure differences do not greatly affect the spray rates and/or spray differences in these relatively small systems. However, as the length of such systems is increased, as in the case of large scale agricultural operations, such two-pipe systems having continuous flow main pipes, become less and less effective because individual sections of the main pipe cannot be placed in exclusive fluid communication with individual sections of the sub-pipe. In other words, problems arise because the full force of the entire incoming water supply is not delivered directly and exclusively to one water dispensing sub-pipe. Again, this drawback takes on more and more importance as the system is extended farther and farther away from the source of hydrostatic pressure.

SUMMARY OF THE INVENTION

The agricultural irrigation system of this patent disclosure can be thought of as two separate pipe lines—a water supply line and a separate and distinct water dispensing line—connected by means of at least one, but preferably a plurality of center, valve/connector devices each of which receive two pipes in one side and, in effect, extend each pipe, in series, by coupling the respective pipes with two analogous pipes attached to the opposite side of said connector device. Hence each center, valve/connector device has in total four holes and their associated pipe receiving/coupling means (e.g., threaded openings, flanges, couplers, etc.), two on each of two opposing sides of the center valve/connector device. The receiving/coupling means, such as, for example, threaded holes for receiving threaded pipe ends, all may be of the same size in order to receive pipe ends of the same size; or two holes on one side may be of different sizes in order to accommodate pipes of different sizes. In many cases it may prove advantageous to employ water supply pipes having an inside diameter larger than the inside diameter of the water dispensing pipe. Obviously, in the most preferred embodiments of this invention, all pipes, regardless of their diameters, will be of the same length. It is also contemplated that water supply pipes and/or water dispensing pipes presently used in existing single-pipe agricultural irrigation systems may be employed as the water supply and/or water dispensing pipes in the apparatus and methods taught in this patent disclosure.

The water dispensing pipes contemplate in this disclosure may be provided with water dispensing means (nozzles for dripping, spraying, streaming, etc.) and/or provided with additional mechanical devices such as sub-pipe systems leading from the water dispensing pipes, etc. One particularly useful type of water dispensing pipe for the practice of this invention will be provided with holes of different sizes which can be selectively blocked or opened by a gate system. For example all gates in a given water dispensing pipe unit may be set to cover all openings except those of a given hole size, or they may be set, for example, with every second, third, etc. hole being of a different size, and so forth. Subsequent water dispensing pipes in the water dispensing pipe series of the system may be set at those same sized, or at different, openings. Again, individual pipe units of the same length are highly preferred for both the water supply series and the water dispensing series; otherwise coupling pipe sections will be required. Standardized, steel irrigation pipes of the most common diameter sizes, e.g., 10", 8" and 6" are likewise preferred. Such pipes, however, may be constructed of other materials, e.g., copper, synthetic resin materials, rubber and the like.

Again, the fundamental element for connecting a plurality of successive pipes into applicants' two-pipe agricultural irrigation system according to the teachings of this invention is a center, connector device which is also provided with a valve means capable of passing water in one direction in one chamber while simultaneously blocking water flow in the opposite direction in another distinct chamber. For the purposes of this patent disclosure such a device will be referred to as a center, valve/connector means ("C,V/C means"). In many cases the word "means" should be taken to include a plurality of such center, valve/connector means connecting adjacent elements of a series of pipes. In cases where one C,V/C means is emphasized, the expression "center, valve/connector device" ("C,V/C device") also may be employed. In either case, use of the word "center" in either designation implies that the valve/connection means will be positioned in a central location between two adjacent pipe elements. Again, two distinct pipe elements are associated with the C,V/C means. That is to say a first water supply pipe and a first water dispensing pipe will be coupled to one side of the C,V/C means and a second water supply pipe and a second water dispensing pipe will be coupled to the opposite side of that same C,V/C means. The second water supply pipe is positioned opposite the first water supply pipe and the second water dispensing pipe is positioned opposite the first water dispensing pipe.

Hence, the use of two or more C,V/C devices, all having same hole locations, sizes, etc., will produce a pipe orientation such that the water supply pipe and water dispensing pipe will be parallel to each other.

The most fundamental version of applicants irrigation system will have at least one such C,V/C device and some means, such as an elbow, for connecting the ends of both pipe series to each other. However, any number of successive center valve/connector devices (2, 3, 4, . . . n) may be connected to the ends of successive water supply and water dispensing pipe elements in order to extend the length of the irrigation system at will. For the purposes of this patent disclosure, such a system of C,V/C means may also be referred to as a "plurality" of such devices. For reasons hereinafter more fully developed, such a system will, in effect, only be limited in length by pumping capacity and/or by natural barriers, legal boundaries, etc., as opposed to being limited by the incidence of falling fluid pressures at more and more distant water dispensing pipes in a given series. It should also be noted in passing that applicants' system is not limited to "linear" expansion. That is to say that it is contemplated that 90°, 60°, 45°, 30°, etc. "elbow" units may be employed to extend the ends of this system in perpendicular and oblique directions with respect to its original direction.

Aside from the four holes in its housing, each C,V/C device is provided with a valve system (and means to operate it) capable of forming at least two chambers in the housing of said C,V/C device. Such chambers are related to at least two distinct modes of operation of said devices. In a first mode of operation, water flowing under pressure from a water supply source in a first (in-coming) direction will enter one side of the C,V/C device via a first water supply hole and pipe receiving-/coupling means (such as a threaded end, flange, etc.), pass directly through a first chamber formed by valves in the C,V/C means and exit through a second water supply hole and pipe coupling means on the opposite side of the C,V/C means. In this first mode of operation, the valve system also prevents the incoming water flow from reaching either the first or the second water dispensing couplings of the C,V/C device. Thus the C,V/C device, in this first mode of operation, serves to form a chamber which couples the first water supply pipe, in series, with a successive water supply pipe while preventing the incoming water supply from exiting the C,V/C device from either of its water dispensing holes.

In its second mode of operation, the C,V/C device's valve system forms a second chamber which forces and directs the stream of water coming in the C,V/C device via its first water supply hole, back out of the C,V/C device and into the (first) water dispensing hole and pipe coupling means located on the same side of the C,V/C device as the incoming water supply pipe. Thus, the valve system, in its second mode of operation, in effect, blocks fluid flow to the opposite side of the device. That is to say it blocks fluid flow to both the second water supply hole and pipe coupling means and the second water dispensing hole and pipe coupling means.

After passing through the "last" (i.e., most distant from the water supply source) C,V/C device of the water supply pipe series, the incoming water is then transferred to a "first" water dispensing pipe. This "first" water dispensing pipe is connected to the downstream side of the "last" C,V/C device in a particular pipe series. Again, when the last C,V/C device is in its first mode of operation, back flow through the C,V/C device is blocked by its valve system in the manner previously noted. Hence, if the first water dispensing pipe has water dispensing holes along its length, streams, sprays, etc. of water will be emitted from said first water dispensing pipe into a first, contiguous, water receiving zone in which agricultural plants are growing. Note that the entire water supply, under its full pressure, is delivered only to the first water dispensing pipe. If such water dispensing holes are found over essentially the entire length of the first pipe, the width of the first water receiving zone will approximate the length of the first water dispensing pipe. Similarly the length of the second, third, etc. water receiving zone, respectively laying continuous to the second, third, etc., water dispensing pipes, will be determined by the holes in said second, third, etc. water dispensing pipes.

The valve system of the C,V/C device may be constructed with any number of valve configurations and/or valve seating means known to the valve making art. For example any of the 4 holes (and/or their associated coupling means) in such a C,V/C device may be "blocked" by "ball-shaped" valves, "gate-shaped" valves, "vane-shaped" valves and the like. However, for purposes of simplicity of illustration of the concepts of this patent disclosure such valves will generally be described and discussed as if they had flat gate or vane configurations. For example, most of the C,V/C valves illustrated in this patent disclosure will be depicted as having a "T"-shaped vane. Such a T-shaped vane also is, in fact, a preferred "real" embodiment of a valve system which can be effectively employed in such C,V/C devices. Such a T-shaped vane may be made in a single, monolithic piece; or the "stem" of the T configuration may be rotatable to a point where, in effect, it represents one-half of the top cap or ledge of the T configuration. Similarly one of the two top halves of the cap of the T may be provided with means of rotation such that the "T" configuration becomes an "L" configuration whose "stem" and "base" portions are most preferably of the same length. This ability to switch a given valve from a "T" to an "L" configuration provides an ability to convert a center, valve/connector means into an end, valve/connector means hereinafter more fully described. Other particularly preferred valves are "gates" which are lowered in front of or raised away from the various 4 holes in the C,V/C device as well as lowered and raised to form internal chambers in said C,V/C devices.

Again, the means for transferring the incoming flow of water from the "last" water supply pipe to the "first" water dispensing pipe could be as simple as an "elbow" unit which connects the last water supply pipe of a series to a first water dispensing pipe of that series. However, in some more preferred embodiments of this invention, the means for transferring the incoming water flow from the last water supply pipe back to the first water dispensing pipe is an end, connector/valve means ("E,V/C means" or "E,V/C device", etc.) having an L-shaped configuration, as opposed to the T-shaped configuration of the C,V/C means. In this case, use of the word "end" implies that the end, connector/valve device is connected to a "last" water supply pipe. It should also be noted in passing that a modified (e.g., modified by plugging some of its holes) center, valve/connector means, in a second mode of operation, wherein water coming into the first water supply coupling means is forced out of the first water dispensing pipe, could be employed as an "end" valve connector means. So employed, the two holes on the "downstream" side of the C,V/C means are preferably plugged as well as shielded by the valve. Note once again that a hinged "T" shaped valve could be converted into an "L" shaped configuration. Consequently, a C,V/C device provided with such a hinged T could easily be converted into an E,V/C device.

However, in some of the most preferred embodiments of the herein disclosed irrigation systems, an E,V/C means is especially adapted for this purpose. To this end, its valve system will preferably have an "L" shaped configuration rather than the "T" configuration of the C,V/C device. Such an E,V/C device, in its most preferred embodiments, also will have a four hole system much like the four hole system of the center, valve/connector means. However, depending on certain details of use hereinafter more fully described, such E,V/C devices will also have their own distinct first and second modes of operation. Moreover, in either mode of operation, any unemployed water supply coupling is preferably plugged so that the "water tight" nature of the housing can be maintained not only by the valve system, but by the plug or plugs placed on the "downstream" side of the E,V/C device.

The utility of having such a second, water supply hole follows from the fact that such an E,V/C means can be used as the "end", water transferring device, e.g., the left end or the right end of a "left leg" (hereinafter more fully described) of such a system or as the "end" (left end or right end element) of a "right leg" of such a system. Moreover, in ways hereinafter more fully described, the second water dispensing hole of such an E,C/V device, located on its downstream side, could be plugged or it could be attached to an "auxiliary first" water dispensing pipe. Such an auxiliary first water dispensing pipe would have its farthest end plugged so that it was capable of watering an "auxiliary first" water receiving zone located next to the "first" water receiving zone contiguous to the "first" water dispensing pipe. This auxiliary first dispensing zone could be watered through use of a first mode of valve operation wherein the valve forces water coming into the E,V/C unit's first (upstream side) water supply hole and pipe coupling means into fluid communication with its second (downstream side) water dispensing coupling means and hence into fluid communication with the auxiliary first water dispensing pipe while simultaneously blocking fluid communication with the "first" water dispensing pipe attached to said end, valve/connector unit.

The preferred E,V/C device is preferably constructed with four pipe receiving holes even though all four holes are not needed to perform certain water transfer functions. Again, such a 4-hole configuration allows the E,V/C device to be used either on the left end of a pipe series or on the right end of a series. Thus an end, valve/connector means could either be constructed without a second, downstream side water supply pipe hole/coupling means, or such a means, if present, could be plugged. In other words, a four holed E,C/V means can be used as a left "end" element or a right "end" element simply by changing a plug from one side of the device to the other side (e.g., from the downstream water supply hole to the upstream water supply hole). This eliminates the need for a distinct left end unit and a distinct right end E,V/C device. Finally, it should also be noted in passing that such E,V/C means can be modified to act as "elbows" (90°, 60°, 45°, etc.) in an overall irrigation system.

Such potential for variation is useful, but not necessary to the practice of this invention. In one of its most fundamental versions, applicants' irrigation system will only be comprised of: (1) at least two successive water supply pipes connected in a water supply pipe series by a center, valve/connector means which couples successive pipes of said water supply pipe series; (2) at least two water dispensing pipes connected in a water dispensing pipe series by the center, valve/connector means which also couples successive pipes of the water supply pipe series; (3) means for delivering a water supply to the water supply pipe series; (4) fluid transfer means for transferring a water supply from the water supply pipe series to the water dispensing pipe series; (5) means for capping or plugging the water dispensing pipe series; and (6) at least one, but again, preferably, a plurality of center, valve/connector means which couple successive pipes of the water supply pipe series and successive pipes of the water dispensing pipe series in a two-pipe agricultural irrigation system wherein at least one center, valve/connector means in said system comprises: (a) a housing having (i) a first side provided with a first, (upstream side) water supply hole and pipe coupling means and a first (upstream side) water dispensing hole and pipe coupling means, (ii) a second side positioned opposite (or "downstream" from) the first side and provided with a second, water supply hole and pipe coupling means aligned with the first water supply hole and pipe coupling means and a second, water dispensing hole and coupling means aligned with the first, water dispensing hole and pipe coupling means and (iii) means for mounting and seating a valve in said housing; (b) a valve system, mounted in said housing, and so adapted and arranged that said valve can be (i) operated in a first mode of operation wherein fluid communication is established in said housing, in an incoming supply water flow direction, from the water supply into the first (upstream side), water supply hole and pipe coupling means, through the housing and out of the second (downstream side), water supply hole and pipe coupling means and thereby creating at least a portion of the water supply pipe series, while simultaneously blocking fluid communication of the water supply with both the first and the second water dispensing hole and pipe coupling means and wherein said first mode of operation of the valve also prevents fluid communication, in a direction opposite to that of the incoming flow direction, between the second, water dispensing hole and pipe coupling means and the first, water dispensing hole and pipe coupling means or (ii) operated in a second mode of operation wherein said valve system also blocks fluid communication of the incoming water supply with both the second, water supply hole and pipe coupling means and the second, water dispensing hole and pipe coupling means and thereby forcing the water supply delivered via the first, water supply hole and pipe coupling means to reverse direction in the housing and exit said housing via the first, water dispensing hole and pipe coupling means, and (c) means for switching the valve from its first mode of operation to its second mode of operation.

In some of the more preferred embodiments of this irrigation system the means for delivering the water supply to the water supply pipe series is a simple pipe coupling device. However, in some preferred embodiments of this invention, the means for transferring the water supply to the water supply pipe series a certain end, valve/connector means comprising: (a) a housing having: (i) a first (upstream) side provided with a first, water supply hole and pipe coupling means and a first, water dispensing hole and pipe coupling means, (ii) a second side, positioned opposite (and hence downstream from) the first side, and provided with a second (downstream) water supply hole and pipe coupling means aligned with the first, water supply hole and pipe coupling means and a second (downstream), water dispensing hole and pipe coupling means aligned with the first, water dispensing hole and pipe coupling means and (iii) means for mounting and seating a valve system in said housing, (b) means for delivering the water supply to the first, water supply hole and pipe coupling means, means for plugging the second, water supply hole and pipe coupling means and means for connecting the second, water dispensing hole and pipe coupling means to the water supply pipe series, (c) a valve system, mounted in said housing, so adapted and arranged that said valve system can be operated (i) in a first mode of operation wherein fluid communication is established in an incoming water supply flow direction from the water supply into the first, water supply hole and pipe coupling means, through the housing and out of the second, water dispensing hole and pipe coupling means and thereby creating a first element of a left leg of a water supply pipe series while simultaneously blocking fluid communication of the water supply with the first water dispensing hole and pipe coupling means or (ii) operated in a second mode of operation wherein the valve blocks fluid communication of the water supply with the second, water dispensing hole and pipe coupling means and the second, water supply hole and pipe coupling means and thereby forcing the water supply delivered via the first, water supply hole and coupling means to exit said housing via its first, water dispensing hole and pipe coupling means and into another right leg of said agricultural irrigation system; and (d) means for switching the valve from the first mode of operation to the second mode of operation. Again, such an end, valve/connector means is most preferably adapted for use on either the left end or on the right end of a given water supply pipe series.

In other preferred embodiments of this invention, the means for capping the water dispensing pipe series is not a cap or pipe plug, but rather an end, valve/connector means comprising: (a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first, water supply hole and pipe coupling means and a second, water dispensing hole and coupling means aligned with the first, water dispensing hole and pipe coupling means and (iii) means for mounting and seating a valve system in said housing, (b) means for delivering the water supply to the first, water supply hole and pipe coupling means, means for plugging the second, water supply hole and pipe coupling means and means for connecting the second, water dispensing hole and coupling means to the water supply, (c) a valve system, mounted in said housing, so adapted and arranged that said valve can be operated (i) in a first mode of operation wherein fluid communication is established in an incoming flow direction from the water supply into the first, water supply hole and pipe coupling means, through the C,V/C's housing and out of the second, water dispensing hole and pipe coupling means and into a plugged end pipe means while simultaneously blocking fluid communication of the incoming water supply with the first water dispensing hole and pipe coupling means or (ii) in a second mode of operation wherein the valve blocks fluid communication of the incoming water supply with the second, water dispensing hole and pipe coupling means and thereby forcing the water supply delivered via the first, water supply hole and pipe coupling means to reverse direction in the housing and exit said housing via the first, water dispensing hole and pipe coupling means and into the water dispensing pipe series of said agricultural irrigation system, and (d) means for switching the valve from the first mode of operation to the second mode of operation.

In one particularly preferred embodiment, the overall preferred configuration will comprise: (1) at least three successive water supply pipes each connected in a water supply pipe series by at least two center, valve/connector means which couple successive pipers of a water supply pipe series; (2) at least three water dispensing pipes connected in a water dispensing pipe series by the same center, valve/connector means which couple successive pipes of the water supply pipe series; (3) a first end, valve/connector means comprising: (a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first, water supply hole and pipe coupling means and a second, water dispensing hole and coupling means aligned with the first, water dispensing hole and pipe coupling means and (iii) means for mounting a valve in said housing; (b) means for delivering the water supply to the first, water supply hole and pipe coupling means, means for plugging the second, water supply hole and pipe coupling means and means for connecting the second, water dispensing hole and coupling means to the water supply pipe series; (c) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water dispensing hole and pipe coupling means and thereby creating at least a portion of a water supply pipe series of a first leg of the system while simultaneously blocking fluid communication of the water supply with the first water dispensing hole and pipe coupling means or (ii) in a second mode of operation wherein the valve blocks fluid communication of the water supply with the second, water dispensing hole and pipe coupling means and the second, water supply hole and pipe coupling means and thereby forcing the water supply delivered via the first, water supply hole and pipe coupling means to reverse direction in the housing and exit said housing via the first, water dispensing hole and pipe coupling means and into another leg of said agricultural irrigation system; and (d) means for switching the valve from the first mode of operation to the second mode of operation; (4) a second end, valve/connector means comprising: (a) a housing having (i) a first side provided with a first, water supply hole and pipe coupling means and a first, water dispensing pipe coupling means, (ii) a second side, opposite the first side, provided with a second, water supply hole and pipe coupling means aligned with the first, water supply hole and pipe coupling means and a second, water dispensing coupling means aligned with the first, water dispensing hole and pipe coupling means and (iii) means for mounting a valve in said housing; (b) means for delivering the water supply to the first, water supply hole and pipe coupling means, means for plugging the second, water supply hole and pipe coupling means and means for plugging the second, water dispensing hole and coupling means; (c) a valve, mounted in said housing, so adapted and arranged that said valve can be operated: (i) in a first mode of operation wherein fluid communication is established in an incoming flow direction from the water supply into a first, water supply hole and pipe coupling means, through the housing and out of the second, water dispensing hole and pipe coupling means and thereby forcing the water supply delivered via the first, water supply hole and pipe coupling means to reverse direction in the housing and exit said housing via the first, water dispensing hole and pipe coupling means and into another leg of said agricultural irrigation system while simultaneously blocking fluid communication of the water supply with the first water dispensing hole and pipe coupling means or (ii) in a second mode of operation wherein the valve creates fluid communication of the incoming water supply with the second, water dispensing hole and pipe coupling means; (d) means for switching the valve from the second mode of operation to the first mode of operation; and (5) at least two center, valve/connector means which couple successive pipes of the water supply pipe series and successive pipes of the water dispensing pipe series in a parallel configuration and wherein each center, valve/connector means in said system comprises: (a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first water supply hole and pipe coupling means and a second, water dispensing hole and pipe coupling means aligned with the first, water dispensing hole and pipe coupling means and (iii) means for mounting a valve in said housing; (b) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water supply hole and pipe coupling means and thereby creating at least a portion of the water supply pipe series and simultaneously blocking fluid communication of the incoming water supply with both the first and the second water dispensing hole and pipe coupling means and wherein said first mode of operation of the valve also prevents fluid communication, in a direction opposite to that of the incoming flow direction, between the second, water dispensing hole and pipe coupling means and the first, water dispensing hole and pipe coupling means or (ii) in a second mode of operation wherein the valve blocks fluid communication of the water supply with both the second, water supply hole and pipe coupling means and the second, water dispensing hole and pipe coupling means and thereby forcing the water supply delivered via the first, water supply hole and coupling means to reverse direction in the housing and exit said housing via the first, water dispensing hole and and coupling means, and (c) means for switching the valve from the first mode of operation to the second mode of operation.

DESCRIPTION OF THE DRAWINGS

This invention also can be described in more detail with reference to the accompanying drawings wherein:

FIGS. 1E, 1F and 1G show water flow patterns through various valve arrangements of a C,V/C device, the C,V/C device employing ball-shaped valves rather than gate or vane-shaped valves.

FIG. 1H shows a representative gate valve means for a water dispensing pipe.

FIGS. 1I and 1J show internal details of a C,V/C device.

FIG. 2 is a fragmentary, top sectional view of a fundamental version of the apparatus of this patent disclosure being used to irrigate a first water irrigation zone.

FIG. 3 is a fragmentary, top sectional view of apparatus shown in FIG. 2 being used to irrigate a second water irrigation zone.

FIG. 4 is a fragmentary, top sectional view of a more complex version of the apparatus of this patent disclosure being used to water an auxiliary, first water irrigation zone.

FIG. 5 depicts the apparatus of FIG. 4 being used to water another irrigation zone.

FIG. 6 depicts the apparatus of FIG. 4 watering yet another irrigation zone.

FIGS. 7, 8 and 9 respectively depict a first, a second, and third a stage of the herein disclosed agricultural irrigation methods in a "right leg" of an overall irrigation system constructed according to the teachings of this patent disclosure.

DESCRIPTION OF PREFERRED EMBODIMENTS

Figure 1:
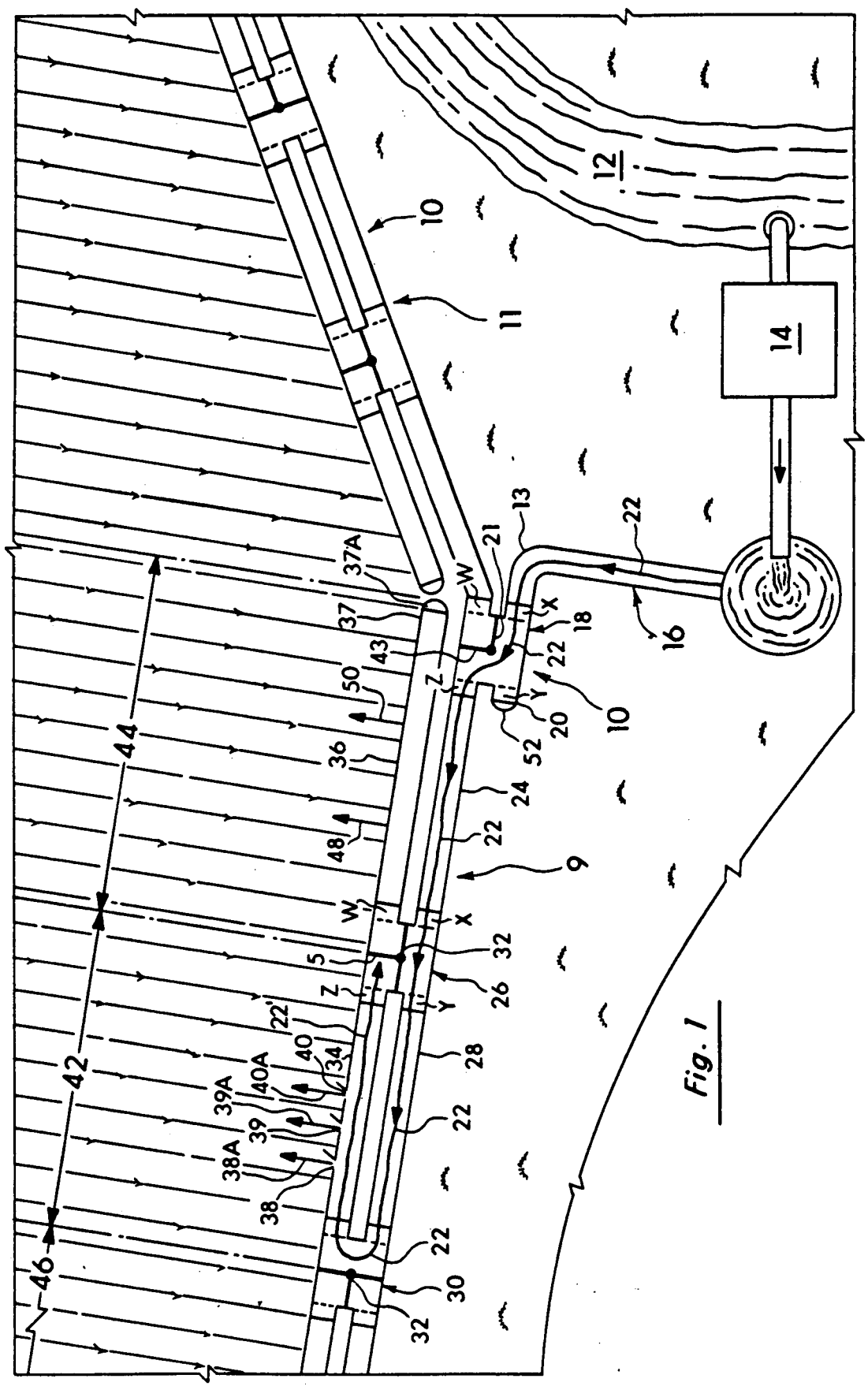
FIG. 1 is a perspective, partial fragmentary, view of a version of our agricultural irrigation system having a left leg and a right leg.

FIG. 1 depicts an agricultural irrigation system 10 constructed according to the teachings of this patent disclosure. Use of the system 10 assumes (1) a water source 12 such as a water ditch, well, etc., (2) a water pressure producing means such as pumping system 14 for putting the water taken from the water source 12 under pressure and (3) a conduit 16 for delivering said water, under pressure, to the irrigation system 10. The particular version of the irrigation system 10 shown in FIG. 1 is depicted with a left leg 9 and a right leg 11 which are each eventually connected to an initial coupling means 13 for coupling a water delivering conduit 16 with the irrigation system 10.

A first element 18 in the irrigation system 10 could be simply a pipe unit, but in some of the most preferred embodiments of this invention, the first element 18 of the system 10 is an end, valve/connector means 20, such as the one shown in FIG. 1, having 4 holes W, X, Y and Z and having a valve means 21 hereinafter more fully described for selectively blocking or opening said holes W, X, Y and Z. Such an end, valve/connector means 20 (or simply a pipe provided with suitable coupling means, i.e., threads, flanges, couples, etc. known to the art) serves to direct an incoming water supply stream 22 (via the path indicated from holes X to Z) into a first water supply pipe 24, through a first, center, valve/connector means 26, (via a path from holes X to Y as indicated) through a second water supply pipe 28 and into a second, center, valve/connector means 30. The stream of water 22 depicted in FIG. 1 does not however pass through the second, center, valve/connector means 30 as it did through the first center, valve/connector means 26, but rather has its direction of flow reversed by a valve system 33 in a second mode of operation whose function is to direct passage of the incoming stream of water 22 from the first incoming water supply hole X to outgoing water dispensing hole W and into a first dispensing pipe 34. The water stream 22 so reversed in its direction of flow is shown directed in a new direction of flow 22' which is in effect opposite to the direction of flow of the incoming water supply stream 22. The reverse or opposite flow 22' of water in the first water dispensing pipe 34 is however eventually blocked by an element F of valve system 5 of the first, center valve/connector unit 26. That is to say that the reverse water flow 22' does not pass through the center valve/connector unit 26 (via hole W and on into water dispensing pipe 36, which is attached to, and positioned parallel to the first, water supply pipe 24), but rather has its flow blocked by vane element F of a valve 5 when center, valve/ connector element 26 is in its previously noted first mode of operation.

Water dispensing pipe 34 (along with the other water dispensing pipes of the dispensing pipe series) is provided with an array of holes 38, 39, 40, etc. (such as those holes shown in FIG. 1H) which dispense respective jets of water 38A, 39A and 40A, etc. on respective contiguous areas to be watered. Again such watering can be aided by spray nozzles, water distribution furrows and/or sub-systems of irrigation apparatus (sub-pipes, root-watering systems, etc.) which are not shown in FIG. 1. In any event, such use of valve system 32, in effect, delivers the entire water supply to a contiguous water irrigation zone 42 thereby serving to define said irrigation zone 42 with a length which is indicated by arrow 42. Irrigation zone 42 is watered exclusively while all other preceding or subsequent counterpart irrigation zones 44, 46, etc. are blocked off from the incoming water supply stream 22. Thus the entire water supply stream 22, under its full head of pressure, is delivered to, and dispensed from water dispensing pipe 34.

After zone 42 has received a desired amount of fluid (water, nutrient fluid, insecticide, etc.), which can be controlled by hand, clock or remote control device, the valve system 5 of center, valve connector means 26 is turned to the second mode of operation analogous to the mode of operation depicted for valve 33 of the second, center valve/connector means 30. Hence, fluid communication with the second water supply pipe 28 is blocked off and the incoming water supply stream 22 will be forced into the water dispensing pipe 36 attached to the first, center valve/connector means 26. The downstream end 37 of water dispensing pipe 36 is depicted as being "plugged". Any pipe plugging device 37A known to the art can be employed for this purpose. Hence water streams 48, 50, etc. would then only be dispensed from water dispensing pipe 36.

It should also be noted that the first element 18 of the agricultural irrigation system 10 depicted in FIG. 1 is an E,V/C means 20 which enables the incoming stream of water 22, from delivery conduit 16, to be directed into either the left leg 9 or the right leg 11 of the overall irrigation system 10. It has its unused pipe coupling means 52 plugged as indicated. The end, valve/connector means 20 is shown with an "L"-shaped valve system 43 rather than the "T"-shaped valve system employed in the center, valve connector means 26, 30, etc. It should also be noted that such an L-shaped valve 21 enables the incoming stream of water 22 to be readily directed to either leg 9 or leg 11 of the overall irrigation system 10 depending on the position of said valve 21. Thus, rotating valve 21 ninety degrees, counter clockwise would direct the stream of water 22 into the right leg 11 of the irrigation system 10. Again, those skilled in this art also will appreciate that the valves of both the end, valve/connector means 20 and all subsequent center, valve/connector means 26, 30, etc. may be operated by hand, local timers and/or remotely controlled valve operating devices including computer programmed and operated devices including those activated by radio signals between a central processing unit and each of the individual valve operating devices in the overall system 10.

Figure 1A:
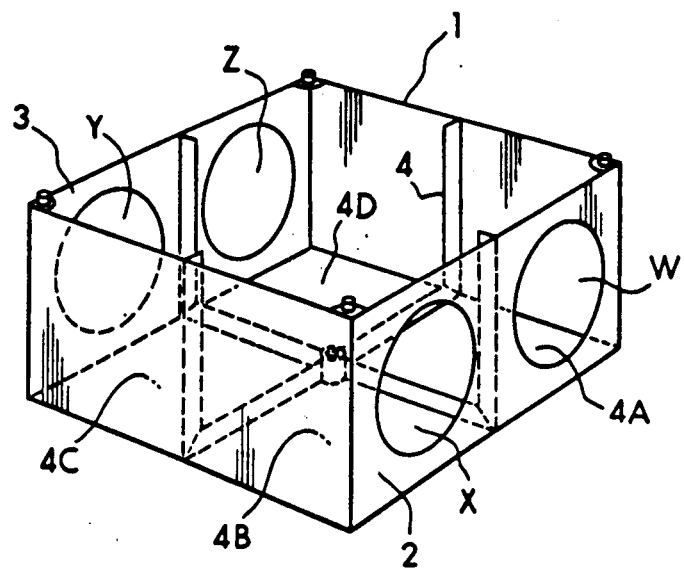
FIGS. 1A, 1B and 1C shown details of a preferred valve arrangement for the C,V/C device of this patent disclosure.

FIG. 1A is a perspective view of a representative center, valve connector device 26 such as the one depicted as item 26 in FIG. 1. It is comprised of a housing 1 having a right side 2 and a left side 3. The housing 1 has four holes W, X, Y, and Z for receiving pipes. The holes will further comprise coupling means (threading, flanges, automatic coupling devices, etc. known to the art), not shown in FIG. 1. The holes W and X shown on the right side 2 of the housing 1 may be of the same diameter or may be of different diameters. Holes Y and Z on the left side 3 of the housing 1 may likewise be of the same or different diameters. However, opposing holes X and Y or W and Z should be of the same diameter. Relating this device 26 to FIG. 1, hole X could receive the first water supply pipe 24, hole W could receive water dispensing pipe 36. Similarly, hole Y could receive water supply pipe 28 and hole Z could receive water dispensing pipe 34. Obviously, connection of the two types of pipes to a series of such center, valve/connector means will hold a "string" or series of the water supply pipes in a parallel relationship to a string or series of the water dispensing pipes. Housing 1 is shown provided with a valve seating means 4 which is shown in a four-spoke configuration which divides the center, valve/connector device 26 into 4 quadrants 4A, 4B, 4C and 4D.

Figure 1B:
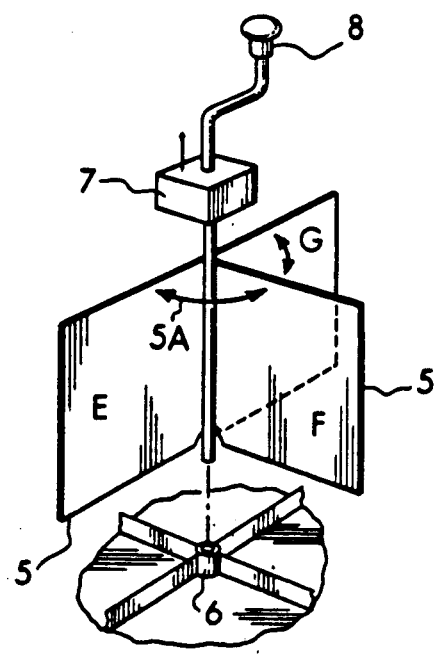
Figure 1C:
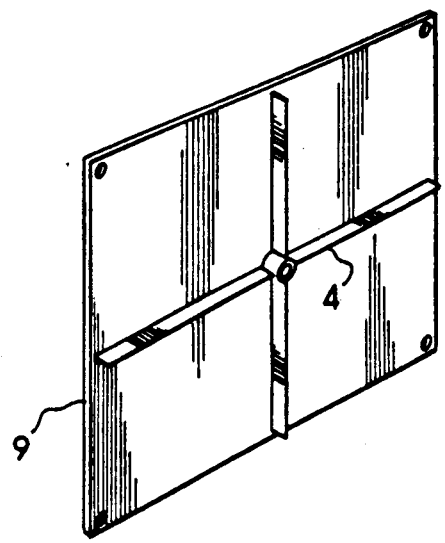
Figure 1D:
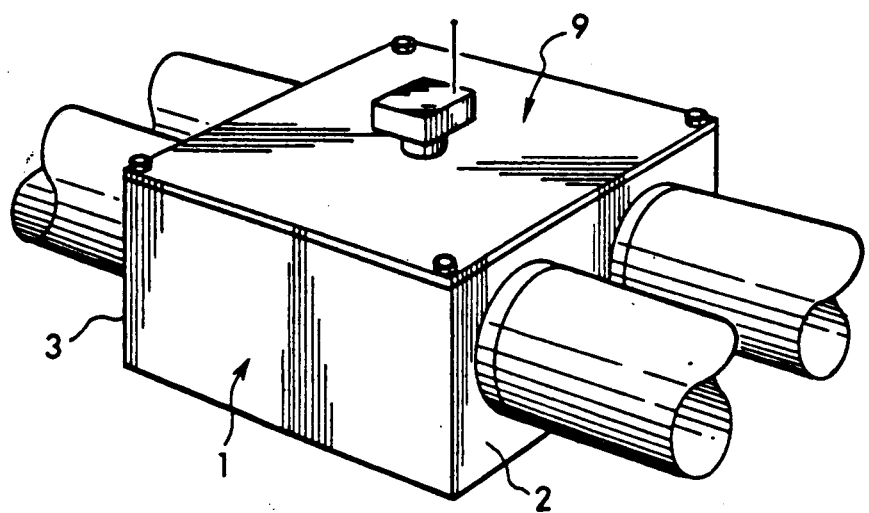
FIG. 1D shows a perspective view of the C,V/C device attached to a system of water supply and water dispersing pipes.
Figure 1:
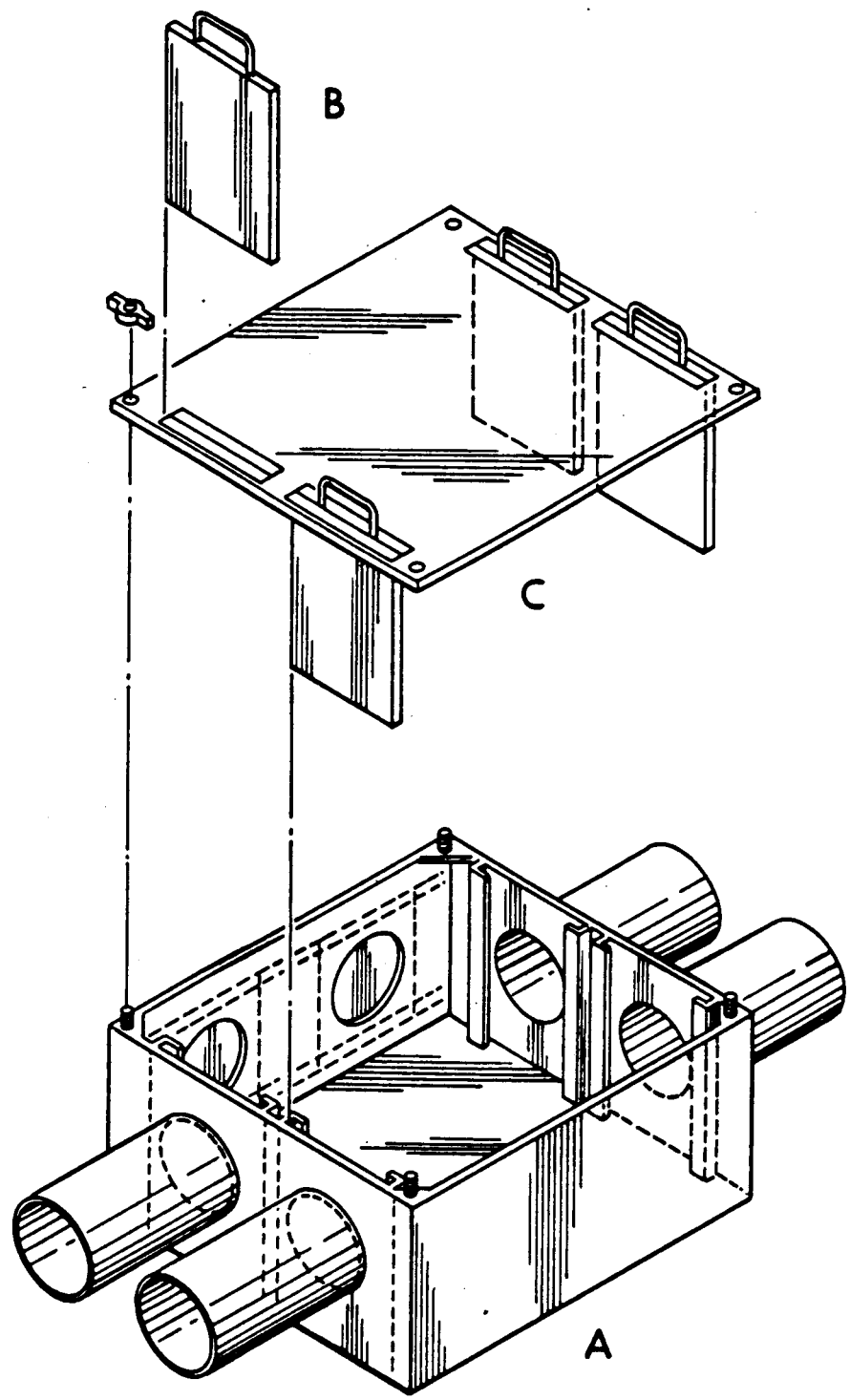

FIG. 1B depicts a valve system 5 having a tripartite vane system. The valve system 5 is depicted in a "T"-shaped configuration having three vanes E, F and G, which are preferably of equal length. However, it should be noted that rotational arrow 5A is intended to depict the idea that vane F can be rotated so that valve 5 would have a straight line configuration and/or that vane E or G can be rotated to produce a valve system 5 with an "L" configuration. The general operation of the valve system 5 is represented by the presence of a pivot 6 which forms a hub of the valve seating means 4. Mechanical, electrical and remote control devices, for operating the valve system 5, known to the art are all depicted as timer device 7. Hand operation of the valve system 5 is depicted by handle 8. FIG. 1C shows the presence of a valve seating means 4 on the underside of a lid 9 to the housing 1. FIG. 1D shows the lid 9 positioned on the housing 1.

FIGS. 1E, 1F and 1G are intended to show that other valve configuration means such as ball check valves can replace the T-shaped vane valve system 5 shown in FIG. 1B in order to practice this invention. FIG. 1H depicts a sliding gate system which can be used to selectively cover or expose water dispensing holes of various sizes in the water dispensing pipe units.

FIGS. 1-I (A, B and C) and I-V (A, B and C) depict a vertically moving gate valve system which could be used in this invention in place of the T-shaped valve depicted in FIGS. 1A and 1B which rotates from its first mode of operation to its second mode of operation.

FIG. 2 shows a version of the apparatus for carrying out the teachings of this patent disclosure wherein a water stream 22 passes through water supply pipe 24 center, valve/ connector means 26, water supply pipe 28 center, valve/connector means 30 and water supply pipe 54. Thereafter it is transferred to a "first" water dispensing pipe 56 from which it is dispensed in water dispensing zone 46. The transfer is accomplished by means of an elbow pipe unit 58 which also serves to reverse the direction of water flow. This reverse flow of water 22' is however blocked by vanes F and G of valve system 32 of center, valve connector means 30.

FIG. 3 depicts center, valve/connector means 30 with valve elements E and G of valve system 32 serving to block fluid flow through the valve/connector means 30 and forcing the incoming water flow 22 in a reverse direction 22' into water dispensing pipe 34 from which it is dispensed under pressure into water dispensing zone 42 by virtue of the fact that its reverse flow 22' is blocked by vanes F and G of center, valve/connector means 26.

FIG. 4 depicts a preferred embodiment of this invention wherein an elbow unit such as that shown in FIGS. 2 and 3 as item 58 is replaced with an end, valve/connector means 59. It is provided with an "L-shaped" valve 60 having two vanes F' and G' formed at right angles to each other. A hole Y of end, valve/connector means 59 is shown plugged with a plug 61 in order to prevent loss of the incoming stream of water 22. When the valve 60 is in the position depicted in FIG. 4 (i.e., its "first" mode of operation) the incoming water stream 22 is directed into an "auxiliary first" water dispensing pipe 62 which waters a contiguous "auxiliary first" water dispensing zone 64. Here again the full volume and pressure of the incoming stream of water 22 is delivered only to water dispensing zone 64 while flow into water dispensing pipe 30 is blocked by vanes F' and G' of end, valve/connector device 59.

FIG. 5 depicts fluid flow through end, valve/connector means 59 in its "second" mode of hole Z while plug 61 blocks hole Y. Hence, the full volume and pressure of incoming stream 22 is delivered, as a reverse flow 22', to water dispensing pipe 34 from which it is delivered to water dispensing zone 46 by virtue of the fact that said reverse flow 22' is blocked by vanes F and G of valve 5 of C,V/C means 26. Here again, the full flow and pressure of the water supply is delivered just to water dispensing pipe 34.

FIG. 6 shows water being dispensed by water dispensing pipe 36 by virtue of the fact that valve 5 of center, valve/connector means 26 is in its second mode of operation wherein downstream holes Y and Z are blocked and water coming into a second chamber created by said second mode of operation is directed out of hole W of C,V/C means 26 and into water dispensing pipe 36. Once again, return flow 22' is blocked by a valve stem element F of a successive C,C/V means 25.

FIG. 7 depicts a right leg 11 of such an irrigation system 10. Note that the end, valve/connector means 59' can be adapted from the end, valve/connector means 59 shown in FIG. 4. That is to say plug 61 covering hole Y in FIG. 4 is removed and located as plug 61' over hole X of C,V/C means 59' in the manner indicated in FIG. 7 so that a first, right irrigation zone 66 receives the full water pressure while E,C/V means 59' is in its first mode of operation.

FIG. 8 depicts E,V/C means 59' in its second mode of operation so that irrigation zone 68 receives the entire flow of water.

Figure 11:
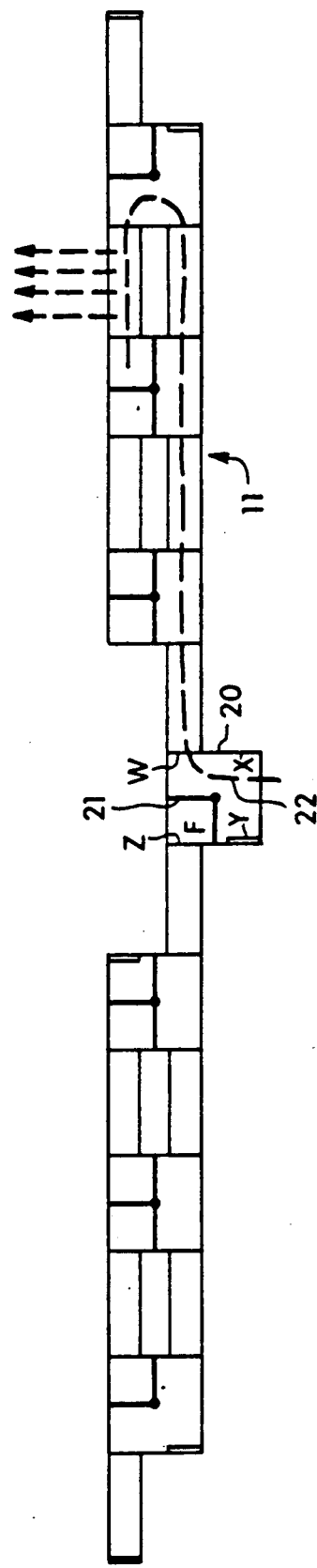
FIG. 11 depicts use of a right leg of the irrigation system while the left leg is blocked off by operation of a species of E,V/C means.

FIG. 9 depicts an end, valve/connector means 20 such as that depicted in FIG. 1 employed as valve/connector means to direct the water stream 22 into the left leg 9 via its holes X and Z (hole Y is plugged) or direct the water stream into the right leg 11 when the L-shaped valve means is rotated 90° counterclockwise as in FIG. 11.

Figure 10:
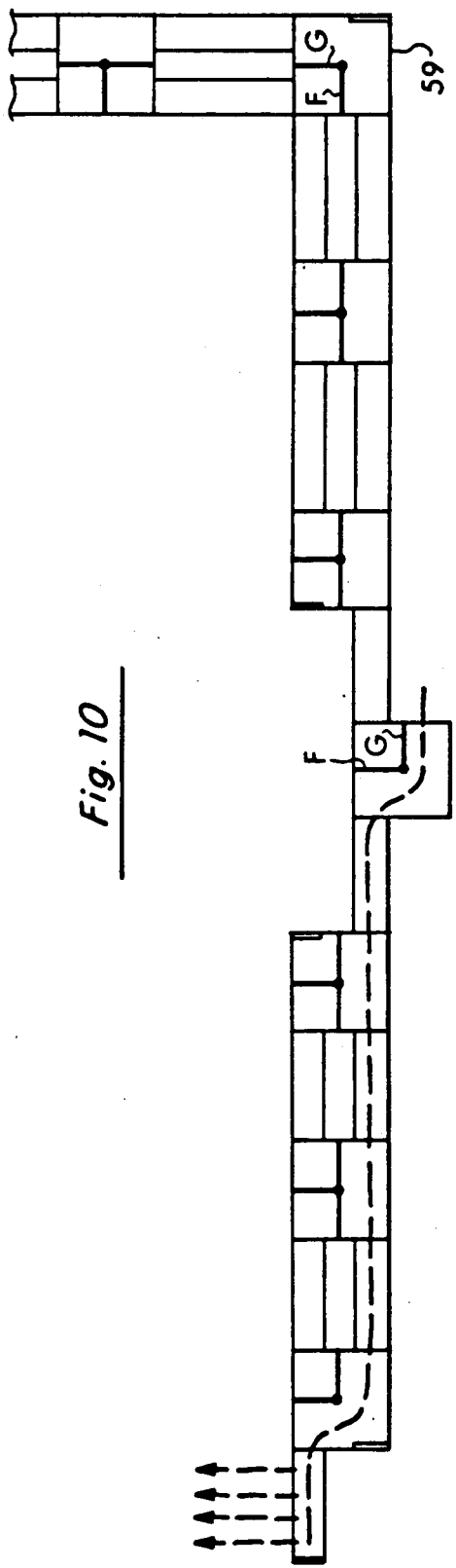
FIG. 10 depicts an overall irrigation system having a right and a left leg wherein the left leg is dispensing water while the right is being blocked off by use of a water supply valve which is connected to both the left and the right legs.

FIG. 10 shows an E,V/C device which is fashioned into a 90° "elbow" unit.

FIG. 11 shows end, valve/connector means 20 in its second mode of operation wherein incoming water stream 22 is directed through holes X and W into right leg 11 by virtue of the fact that holes Z and Y are plugged or blocked.

While certain preferred embodiments of this irrigation apparatus are described above, it should be appreciated that they are given by way of illustration only. They are not intended as limitations since this patent disclosure is intended to cover all modifications, alternatives and equivalents falling within the scope and spirit of this invention as expressed in the appended claims. Thus, for example, even though this invention uses vane type valves in most of its examples, valves having other elements, e.g., gates, balls, etc. are also contemplated as being within this patent disclosure.

Thus having disclosed our invention, we claim:

1. A two pipe agricultural irrigation system comprising:
    (1) at least two successive water supply pipes connected in a water supply pipe series by center, valve/connector means which couple successive pipes of the water supply pipe series;
    (2) at least two water dispensing pipes connected in a water dispensing piper series by the center, valve/connector means which couple successive pipes of the water supply pipe series;
    (3) means for delivering a water supply to the water supply pipe series;
    (4) means for transferring the water supply from the water supply pipe series to the water dispensing pipe series;
    (5) means for blocking flow in the water dispensing pipe series; and
    (6) at least one center, valve/connector means which couples successive pipes of the water supply pipe series and successive pipes of the water dispensing pipe series in a two parallel pipe agricultural irrigation system and wherein the center, valve/connector means in said system comprises:

(a) a housing having: (i) a first side provided with a first, water supply hole and pipe coupling means and a first, water dispensing hole and pipe coupling means, (ii) a second side, opposite the first side, provided with a second, water supply hole and pipe coupling means aligned with the first water supply hole and pipe coupling means and a second, water dispensing hole and pipe coupling means aligned with the first, water dispensing hole and pipe coupling means and (iii) means for mounting a valve in said housing;

(b) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water supply hole and pipe coupling means and thereby creating at least a portion of the water supply pipe series while simultaneously blocking fluid communication of the incoming water supply with both the first and the second water dispensing coupling means and wherein said first mode of operation of the valve also prevents fluid communication, in a direction opposite to that of the incoming flow direction, between the second, water dispensing coupling means and the first, water dispensing coupling means or (ii) in a second mode of operation wherein the valve blocks fluid communication of the water supply with both the second, water supply pipe coupling means and thereby forcing the incoming water supply delivered via the first, water supply hole and pipe coupling means to reverse direction in the housing and exit said housing via the first, water dispensing hole and pipe coupling means, and (c) means for switching the valve from the first mode of operation to the second mode of operation.

2. The irrigation system of claim 1 wherein a plurality of center, valve/connector means are used to construct said system.

3. The irrigation system of claim 1 wherein the means for delivering the water supply to the water supply pipe series is a pipe coupling device.

4. The irrigation system of claim 1 wherein the means for transferring the water supply from the water supply pipe series to the water dispensing pipe series is an elbow-shaped coupling means whose respective ends are connected to an end member of the water supply pipe series and an end member of the water dispensing pipe series.

5. A two pipe agricultural irrigation system comprising:

(1) at least two successive water supply pipes connected in a water supply pipe series by enter, valve/connector means which couple successive pipes of the water supply series;

(2) at least two water dispensing pipes connected in a water dispensing pipe series by the center, valve/connector means which couple successive pipes of the water supply pipe series;

(3) means for transferring the water supply from the water supply pipe series to the water dispensing pipe series;

(4) means for blocking flow in the water dispensing pipe series;

(5) at least one center, valve/connector means which couples successive pipes of the water supply pipe series and successive pipes of the water dispensing pipe series in a two parallel pipe agricultural irrigation system; and (6) means for delivering a water supply to the water supply pipe series wherein the means for delivering the water supply to the water supply pipe series is an end, valve/connector means comprising:

(a) a housing having (i) a first side provided with a first water supply hole and pipe coupling means and a first water dispensing hole and pipe coupling means, (ii) a second side, and pipe coupling means aligned with the first water supply hole and pipe coupling means and a second, water dispensing hole and pipe coupling means aligned with the first water dispensing hole and pipe coupling means and (iii) means for mounting a valve in said housing;

(b) means for delivering the water supply to the first water supply hole and pipe coupling means, means for plugging the second water supply hole and pipe coupling means and means for connecting the second water dispensing hole and pipe coupling means to the water supply pipe series;

(c) a valve, mounted in said housing, so adapted and arranged that said valve can be operated (i) in a first mode of operation wherein fluid communication is established in an incoming flow direction from the water supply into the first water supply hole and pipe coupling means, through the housing and out of the second, water dispensing hole and pipe coupling means and thereby creating at least a portion of a water supply pipe series of a first leg of the irrigation system while simultaneously blocking fluid communication of the water supply with the first water dispensing coupling means or (ii) in a second mode of operation wherein the valve blocks fluid communication of the water supply with the second water dispensing hole and pipe coupling means and the second water dispensing hole and pipe coupling means and thereby forcing the water supply delivered via the first water supply coupling hole and pipe means to reverse direction in the housing and exit said housing via the first water dispensing hole and pipe coupling means and into another leg of said agricultural irrigation system; and (d) means switching the valve from its first mode of operation to its second mode of operation.

6. A two pipe agricultural irrigation system comprising:

(1) at least two successive water supply pipes connected in a water supply pipe series by enter, valve/connector means which couple successive pipes of the water supply series;

(2) at least two water dispensing pipes connected in a water dispensing pipe series by the center, valve/connector means which couple successive pipes of the water supply pipe series;

(3) means for transferring the water supply from the water supply pipe series;

(4) means for blocking flow in the water dispensing pipe series;

(5) at least one center, valve/connector means which couples successive pipes of the water supply pipe series and successive pipes of the water dispensing pipe series in a two parallel pipe agricultural irrigation system; and (6) means for transferring the water supply from the water supply pipe series to the water dispensing pipe series wherein the means for transferring the water supply from the water supply pipe series to the water dispensing pipe series is an end, valve/connector means comprising:

(a) a housing having (i) a first side provided with a first, water supply hole and pipe coupling means and a first water dispensing hole and pipe coupling means, (ii) a second side, opposite the first side, provided with a second water supply hole and pipe coupling means aligned with the first water supply hole and pipe coupling means and a second water dispensing hole and pipe coupling means aligned with the first water dispensing hole and pipe coupling means and (iii) means for mounting a valve in said housing;

(b) means for delivering the water supply to the first water supply hole and pipe coupling means, means for plugging the second water supply hole and pipe coupling means and means for plugging the second water dispensing hole and pipe coupling means;

(c) a valve, mounted in said housing, so adapted and arranged that said valve can be operated (i) in a first mode of operation wherein fluid communication is established in an incoming flow direction from the water supply into the first water supply hole and pipe coupling means, through the housing and out of the second water dispensing hole and pipe coupling means and thereby forcing the water supply delivered via the first water supply hole and pipe coupling means to reverse direction in the housing and exit said housing via the first water dispensing hole and pipe coupling means and into another leg of said agricultural irrigation system while simultaneously blocking fluid communication of the water supply with the first water dispensing hole and pipe coupling means or (ii) in a second mode of operation wherein the valve creates fluid communication of the water supply with the second water dispensing hole and pipe coupling means; and (d) means for switching the valve from its second mode of operation to its first mode of operation.

7. A two pipe agricultural irrigation system comprising:

(1) at least two successive water supply pipes connected in a water supply pipe series by enter, valve/connector means which couple successive pipes of the water supply series;

(2) at least two water dispensing pipes connected in a water dispensing pipe series by the center, valve/connector means which couple successive pipes of the water supply pipe series;

(3) means for transferring the water supply from the water supply pipe series;

(4) means for transferring the water supply from the water supply pipe series to the water dispensing pipe series;

(5) at least one center, valve/connector means which couples successive pipes of the water supply pipe series and successive pipes of the water dispensing pipe series in a two parallel pipe agricultural irrigation system; and (6) means for blocking flow in the water dispensing pipe series wherein the means for blocking the water dispensing pipe series is an end, valve/connector means comprising:

(a) a housing having: (i) a first side provided with a first water supply hole and pipe coupling means and a first water dispensing hole and pipe coupling means, (ii) a second side, opposite the first side, provided with a second water supply hole and pipe coupling means aligned with the first water supply hole and pipe coupling means and a second water dispensing hole and pipe coupling means and (iii) means for mounting a valve in said housing;

(b) means for delivering the water supply to the first water supply hole and pipe coupling means, means for plugging the second water supply hole and pipe coupling means and means for connecting the second water dispensing hole and pipe coupling means to the water supply;

(c) a valve, mounted in said housing, so adapted and arranged that said valve can be operated (i) in a first mode of operation wherein fluid communication is established in an incoming flow direction from the water supply into the first water supply hole and pipe coupling means, through the housing and out of the second water dispensing hole and pipe coupling means and into a plugged end pipe means while simultaneously blocking fluid communication of the water supply with the first water dispensing hole and pipe coupling means or (ii) in a second mode of operation wherein the valve blocks fluid communication of the water supply with the second water dispensing hole and pipe coupling means and thereby forcing the water supply delivered via the first water supply hole and pipe coupling means to reverse direction in the housing and exit said housing via the first water dispensing hole and pipe coupling means and into the water dispensing pipe series of said agricultural irrigation system; and (d) means for switching the valve from its second mode of operation to its first mode of operation.

8. A two parallel pipe agricultural irrigation system comprising:

(1) at least three successive water supply pipes connected in a water supply pipe series by center, valve/ connector means which couple successive pipes of the water supply pipe series;

(2) at least three water dispensing pipes connected in a water dispensing pipe series by the center, valve/connector means which couple successive pipes of the water supply pipe series;

(3) a first end, valve/connector means comprising:

(a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first, water supply hole and pipe coupling means and a second, water dispensing hole and pipe coupling means aligned with the first, water dispensing hole and pipe coupling means and (iii) means for mounting a valve in said housing;

(b) means for delivering the water supply to the first, water supply hole and pipe coupling means, means for plugging the second, water supply hole and pipe coupling means and means for connecting the second, water dispensing hole and pipe coupling means to the water supply pipe series;

(c) a valve, mounted in said housing, so adapted and arranged that said valve can be operated (i) in a first mode of operation wherein fluid communication is established in an incoming flow direction from the water supply into the first, water supply hole and pipe coupling means, through the housing and out of the second, water dispensing hole and pipe coupling means and thereby creating at least a portion of the water supply pipe series while simultaneously blocking fluid communication of the water supply with the first water dispensing hole and pipe coupling means or (ii) in a second mode of operation wherein the valve blocks fluid communication of the water supply with the second, water dispensing hole and pipe coupling means and the second, water dispensing hole and pipe coupling means and thereby forcing the water supply delivered via the first, water supply hole and pipe coupling means to reverse direction in the housing and exit said housing via the first, water dispensing hole and pipe coupling means and into another leg of said agricultural irrigation system; and (d) means for switching the valve from the first mode of operation to the second mode of operation;

(4) A second end, valve/connector means comprising:

(a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first, water supply hole and pipe coupling means and a second, water dispensing hole and pipe coupling means aligned with the first, water dispensing pipe coupling means and (iii) means for mounting a valve in said housing;

(b) means for delivering the water supply to the first, water supply hole and pipe coupling means, means for plugging the second, water supply hole and pipe coupling means and means for plugging the second, water dispensing hole and pipe coupling means;

(c) a valve, mounted in said housing, so adapted and arranged that said valve can be operated: (i) in a first mode of operation wherein fluid communication is established in an incoming flow direction from the water supply into the first, water supply hole and pipe coupling means, through the housing and out of the second, water dispensing hole and pipe coupling means and thereby forcing the water supply delivered via the first, water supply hole and pipe coupling means to reverse direction in the housing and exit said housing via the first, water dispensing hole and pipe coupling means and into another leg of said agricultural irrigation system while simultaneously blocking fluid communication of the water supply with the first water dispensing hole and pipe coupling means or (ii) in a second mode of operation wherein the valve creates fluid communication of the water supply with the second, water dispensing hole and pipe coupling means;

(d) means for switching the valve from the second mode of operation to the first mode of operation; and (5) a center, valve/connector means comprised of at least two center, valve/connector devices which couple successive pipes of the water supply pipe series and successive pipes of the water dispensing pipe series in a two parallel pipe agricultural irrigation system and wherein each center, valve/connector devices comprises:

(a) a housing having (i) a first side provided with a first, water supply hole and pipe coupling means and a first, water dispensing hole and pipe coupling means, (ii) a second side, opposite the first side, provided with a second, water supply hole and pipe coupling means aligned with the first water supply hole and pipe coupling means and a second, water dispensing hole and pipe coupling means aligned with the first, water dispensing hole and pipe coupling means and (iii) means for mounting a valve in said housing;

(b) a valve, mounted in said housing, so adapted and arranged that said valve can be operated: (i) in a first mode of operation wherein fluid communication is established in an incoming flow direction from the water supply into the first, water supply hole and pipe coupling means, through the housing and out of the second, water supply hole and pipe coupling means and thereby creating at least a portion of the water supply pipe series while simultaneously blocking fluid communication of the water supply with both the first and the second water dispensing hole and pipe coupling means and wherein said first mode of operation of the valve also prevents fluid communication, in a direction opposite to that of the incoming flow direction, between the second, water dispensing hole and pipe coupling means and the first, water dispensing hole and pipe coupling means or (ii) in a second mode of operation wherein the valve blocks fluid communication of the water supply with both the second, water supply hole and pipe coupling means and the second, water dispensing hole and pipe coupling means and thereby forcing the water supply delivered via the first, water supply hole and pipe coupling means to reverse direction in the housing and exit said housing via the first, water dispensing hole and pipe coupling means, and (c) means for switching the valve from the first mode of operation to the second mode of operation.

* * * * *